（12）United States Patent
Keipert et al.

(10) Patent No.: US 9,852,603 B2
(45) Date of Patent: Dec. 26, 2017

(54) LOCATING A REMOTE CONTROL DEVICE

(71) Applicant: EchoStar Technologies L.L.C., Englewood, CO (US)

(72) Inventors: Kurt Keipert, Littleton, CO (US); Adam Schafer, Aurora, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 118 days.

(21) Appl. No.: 14/822,024

(22) Filed: Aug. 10, 2015

(65) Prior Publication Data

US 2017/0046941 A1  Feb. 16, 2017

(51) Int. Cl.
*G08B 21/24* (2006.01)
*G05B 15/02* (2006.01)

(52) U.S. Cl.
CPC ............ *G08B 21/24* (2013.01); *G05B 15/02* (2013.01); *G05B 2219/23312* (2013.01)

(58) Field of Classification Search
CPC .............. G08B 21/24; G05B 15/02; G05B 2219/23312; H04W 4/02; H04B 1/202; G01S 5/12
USPC .............. 340/8.1, 539.32, 539.13, 825.49
See application file for complete search history.

(56) References Cited

U.S. PATENT DOCUMENTS

| | | | | |
|---|---|---|---|---|
| 5,485,163 A | * | 1/1996 | Singer ................... | G01S 5/0054 340/7.27 |
| 2006/0109112 A1 | * | 5/2006 | Haines ..................... | G01S 5/12 340/539.32 |
| 2017/0038787 A1 | * | 2/2017 | Baker ................. | H05B 37/0272 |

* cited by examiner

*Primary Examiner* — Ali Neyzari
(74) *Attorney, Agent, or Firm* — Bejin Bieneman PLC

(57) ABSTRACT

A system includes a networked device is programmed to transmit, to one or more second networked devices, a request to locate a remote control device of the networked device. Based on the responses to the request, the networked device is further programmed to provide an indication via a user interface of the networked device concerning a location of the remote control device.

22 Claims, 6 Drawing Sheets

LOCATING A REMOTE CONTROL DEVICE

BACKGROUND

A home may include various systems and devices for providing media content, e.g., televisions, sound systems and the like, each connected to a networked device such as a set-top box. Additionally, the home may include one or more smart devices such as appliances, thermostats, security cameras, etc. connected to or associated with a networked device. Each of these networked devices may be controlled by a remote control device. Over the course of a day, a user may use the remote control device to control multiple applications with the result that the remote control device may be left in different areas of the home. Some networked devices are programmed to send a command instructing the remote control device to generate an audible signal in order to help a user locate it. However, the remote control device may be in another room, and out of range of the networked device, and therefore the remote control device may not respond to the command.

DRAWINGS

DETAILED DESCRIPTION

System Overview

Figure 1:
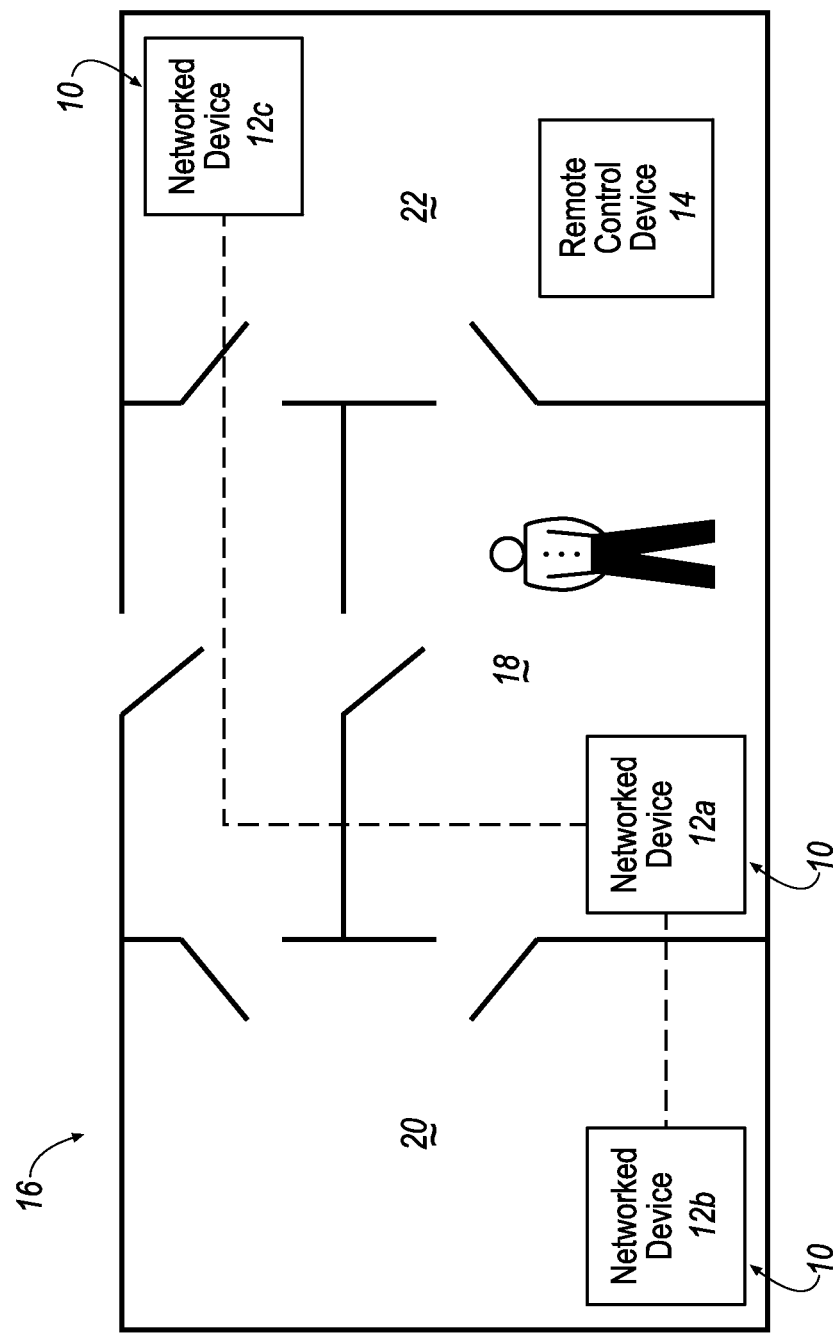
FIG. 1 is a diagram of an exemplary remote control device locator system within a customer premises.

A system 10 that uses communicatively coupled networked devices 12 to search for the remote control device 14 throughout a customer premises 16 can help a user to find the remote control device 14, saving time and aggravation. For example, as shown in FIG. 1, a system 10 located in a customer premises 16 may include first, second and third networked devices 12a, 12b and 12c that are communicatively coupled, e.g., via wireless and/or wired network such as is known. The user may, via a user interface on the first networked device 12a, activate a search process for a remote control device 14. The first networked device 12a may first search for the remote control device 14, as described below. If the first networked device 12a does not locate the remote control device 14, because, e.g., the remote control device 14 is out of range of the device 12a, the first networked device 12a may instruct the second and third networked devices 12b, 12c, to search for the remote control device 14. The second and third networked devices 12b, 12c may similarly search for the remote, and report the results back to the first networked device 12a. Based on information received from the second and third networked devices 12b, 12c, the networked device 12a may determine, as described below, the location of the remote control device 14. The networked device 12a, may, e.g., display, via the user interface, information related to the location of the remote control device 14 to the user. Further, the networked device 12a may, via one or both of the first and second networked devices 12b, 12c, send a command to the remote control device 14 to generate an audible signal to help the user find the remote control device 14.

The system 10 allows the user, from a single location, to search other rooms in a customer premises 16, to determine the location of the remote control device 14 within the customer premises 16, saving the user time and aggravation.

Exemplary System Elements

Referring now to FIG. 1 in more detail, an exemplary system 10 includes first, second and third networked devices 12a, 12b, 12c. Each of the first, second and third networked devices 12a, 12b, 12c is communicatively coupled, either directly, or indirectly, e.g., through another networked device 12, with each other. Further, each of the first, second and third networked devices 12a, 12b, 12c is configured to communicate with the remote control device 14. Networked devices 12 may include, e.g., set-top boxes, media streaming devices, sound systems, gaming systems, home appliances, thermostats, lighting control modules, security cameras, etc. that are configured for communicating with each other, e.g., on a network, and further configured for communicating with a remote control device 14.

For purposes of illustration, the system 10 may be located in a customer premises 16, e.g., a residence, having first, second and third rooms 18, 20, 22. The first, second and third networked devices 12a, 12b, 12c may be located respectively in the first, second and third rooms 18, 20, 22. Note that this configuration is only an example for illustration and is not intended to limit the system 10. The system 10 may include two or more networked devices 12. There may be multiple networked devices 12 within a single room. Further, the system 10 may be distributed within a single structure, partially within a structure, within multiple structures, or not within a structure at all. For example, the system 10 may include networked devices 12 both inside and outside of the customer premises 16.

As discussed above, the networked devices 12 may communicate, i.e., send and receive commands and data, with each other. For example, as described below, the networked devices 12 may be programmed to send commands to other networked devices 12 requesting the other networked devices 12 to search for a remote control device 14. The networked devices 12 may further be programmed to receive, e.g., data, indicating if one of the other networked devices 12 has identified a location of the remote control device 14, and a strength of a signal received from the remote control device 14.

Communications between the networked devices 12 may be through a wired and/or wireless network as is known. For example, the networked devices 12 may communicate with each other via an Ethernet bus, over coax cable through a Multimedia over Coax Alliance (MoCA) network, etc. Additionally or alternatively, the networked devices 12 may communicate with each other via an IP (Internet Protocol) or WiFi network, via a "smart home" radio frequency (RF) network using a protocol such as Zigbee, Z-wave, etc.

In addition to communicating with each other, each of the networked devices 12 may be configured to communicate with the remote control device 14. For example, the networked device 12 may be a set-top box, and may be programmed to receive commands from the remote control device 14 to select channels for display on a television, to display a guide indicating available programming, to record a program, etc. As another example, the networked device 12 may be a thermostat, and may be configured to receive a command from the remote control device 14 to, e.g., change a temperature setting, turn a fan on or off, turn an air conditioning unit on or off, etc. Further, networked devices 12 may be configured to send commands to the remote control device 14. For example, the networked device 12 may send a command to the remote control device 14 to generate an audible signal, and/or send a return signal back to the networked device 12.

Communications between the networked device 12 and the remote control device 14 may be, e.g., radio frequency (RF) communications and may use a protocol such as Bluetooth, Zigbee, Z-Wave, etc. Additionally or alternatively, other forms of communications, e.g., infrared communications, may be used between the networked device 12 and the remote control device 14.

Figure 2:
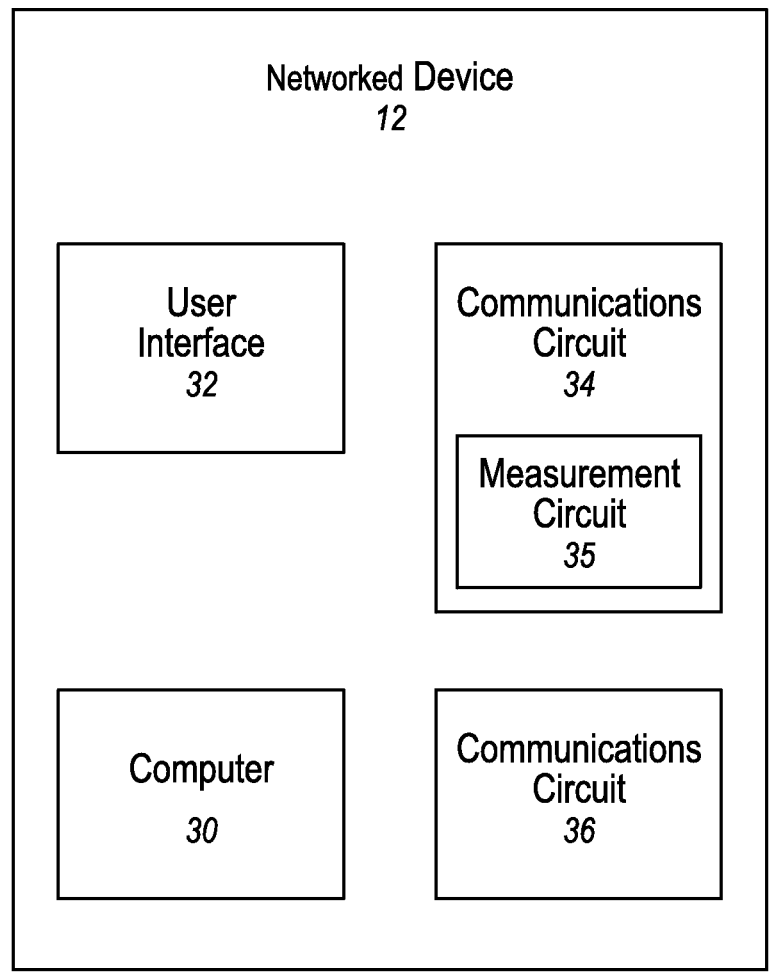
FIG. 2 is a diagram of an exemplary networked device for the remote control device locator system of FIG. 1.

The networked device 12 may be e.g., a set-top box, a streaming device, a household appliance, a controller such as a lighting controller or thermostat, a security camera, etc. that is configured for operation on a network and further configured to communicate with a remote control device 14. As shown in FIG. 2, the networked device 12 may include a computer 30, a user interface 32, a first communications circuit 34 for communicating with the remote control device 34, and a second communications circuit 36 for communicating with one or more other networked devices 12.

The computer 30 includes a memory and a processor, the memory storing program code, i.e., computer-executable instructions, executable by the processor. The computer 30 is communicatively coupled to each of the user interface 32, and the first and second communications circuits 34, 36. The computer 30 may be configured to receive inputs from and provide outputs to a user via the user interface 32. Further, the computer may be configured to exchange messages with the remote control device 14 via the first communications circuit 34 and exchange messages with one or more other networked devices 12 via the second communications circuit 36.

The user interface 32 is communicatively coupled to the computer 30, and may include one or more output devices such as a display, lamps, speakers, etc. for communicating information to the user. The user interface 32 may further include one or more input devices such as buttons, a touch screen display, a mouse, a keyboard, a gesture recognition device, switches, etc., for receiving input from the user.

The first communications circuit 34 is communicatively coupled to the computer 30, and is configured to communicate with the remote control device 14. For example, the first communications circuit 34 may include a radio frequency (RF) transceiver, as is known, for receiving RF transmissions from the remote control device 14. The transceiver may include and/or be connected to, one or more RF antennas. The first communications circuit 34 may further include circuitry as is known to extract digital messages from received RF transmissions, and to provide the digital messages to the computer 30. Further, the first communications circuit 34 may include the circuitry as is known to generate RF transmissions from digital messages that it receives from the computer, and transmit those messages to the remote control device 14.

The first communications circuit 34 may include a measurement circuit 35. The measurement circuit 35 may be configured to measure, e.g., in a known manner, a strength of a signal received from the remote control device 14. Based on the measurement of a received signal, the first communications circuit 34 may provide a received signal strength indication (RSSI) to the computer 30. As discussed below, the strength of the signal received from the remote control device 14 may be an indication of the distance (also referred to herein as range) of the remote control device 14 from the networked device 12.

Additionally or alternatively, the first communications circuit 34 may include an infrared transmitter and receiver, for communicating with the remote control device 14.

The second communications circuit 36 is also communicatively coupled to the computer 30, and is configured to communicate with one or more other networked devices 12. The second communications circuit 36 may include, for example, an interface to a wired bus network such as an Ethernet bus, Multimedia over Coax Alliance (MoCA) bus, etc. Additionally or alternatively, the second communications circuit 36 may include a radio frequency (RF) transceiver, and may be configured to communicate with other networked devices 12 according to a protocol such as Bluetooth, Zigbee, Z-Wave, etc. The transceiver may include or be connected to one or more RF antennas. The second communications circuit 36 may further include circuitry as is known to extract digital messages from messages received over the wired or wireless bus, and provide the digital messages to the computer 30. Also, the second communications circuit may include circuitry as is known to convert digital messages received from the computer 30 to a format suitable for transmission over the wired or wireless network.

In some cases, the first communications circuit 34 for communicating with the remote control device 14, and the second communications circuit 36 for communications with the one or more other networked devices 12, may be combined. That is, the first communications circuit 34 and second communications circuit 36 may share some or all components such as the radio frequency (RF) transceiver, RF antenna, circuitry for converting digital data to RF signals, circuitry for extracting digital data from RF signals, etc.

The computer 30 of the networked device 12, as described in detail below, may be programmed to perform a search for a remote control device 14 within part or all of a network of interconnected networked devices 12. Upon receiving an input from the user, e.g., via the user interface 32, the computer 30 may execute the search. The networked device 12 may first search locally, i.e., within the transmission range of the first networked device 12, for the remote control device 14. The transmission range may be defined, for example, as within the range that the remote control device 14 can receive a message from, and transmit a message to, the networked device 12. If, the networked device 12 does not locate the remote 14 within the transmission range, the networked device 12 may expand the search to include other networked devices 12 in the system 10.

The remote control device 14 may generally be used to control one or more networked devices 12. For example, the remote control device 14 may be used to control a set-top box 12 to select a channel to be displayed on a display, select a program for streaming, command the set-top box 12 to record or playback a program, etc. As another example, the remote control device 14 may be used to control, e.g., a thermostat 12, and may command the thermostat 12 to change a temperature setting, turn a fan on or off, turn an air conditioning unit on or off, etc.

Figure 3:
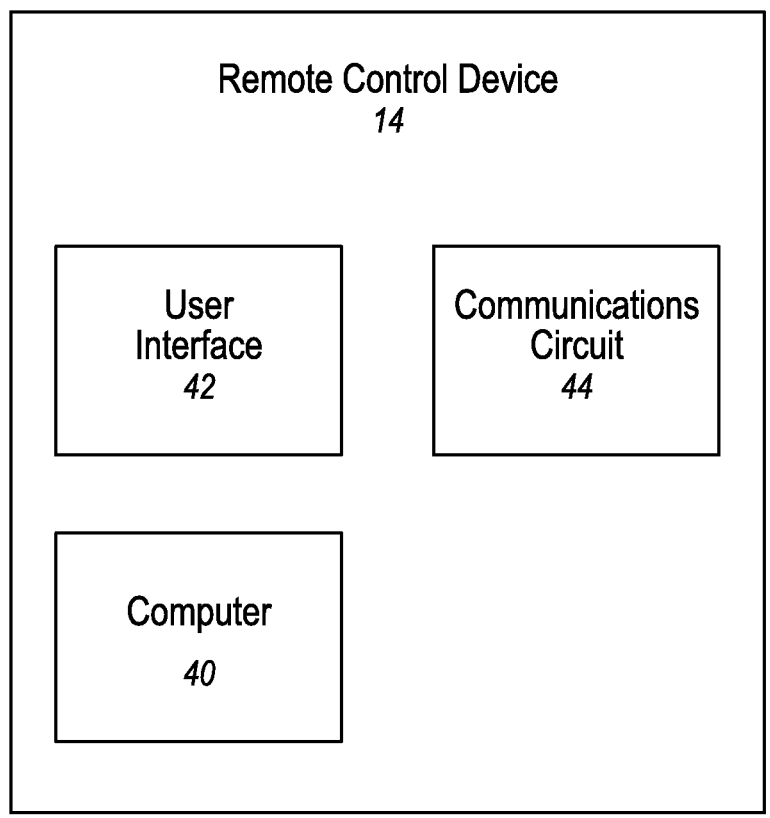
FIG. 3 is a diagram of an exemplary remote control device for the remote control device locator system of FIG. 1.

As shown in FIG. 3, the remote control device 14 may include a computer 40, a user interface 42, and a communications circuit 44 for communicating with one or more networked devices 12.

The computer 40 includes a memory and a processor, the memory storing program code, i.e., computer-executable instructions, executable by the processor. The computer 40 is communicatively coupled to the user interface 42, and the communications circuit 44. The computer 40 generally is configured to receive inputs from and provide outputs to a user via the user interface 42. Further, the computer 40 is configured to exchange messages with the one or more networked devices 12 via the communications circuit 44.

The user interface 42 is communicatively coupled to the computer 40, and may include one or more output devices such as a display, lamps, speakers, etc. for communicating information to the user. The user interface 42 may further include one or more input devices such as buttons, a touch screen display, a mouse, a keyboard, a gesture recognition device, switches, etc., for receiving input from the user.

The communications circuit 44 is communicatively coupled to the computer 40, and is configured to communicate with one or more networked devices 12. For example, the communications circuit 44 may include a radio frequency (RF) transceiver, as is known, for receiving RF transmissions from the networked device 12. The transceiver may include and/or be connected to one or more RF antennas. The communications circuit 44 may include circuitry as is known to extract digital messages from received RF transmissions, and provide the digital messages to the computer 40. Conversely, the communications circuit 44 may include circuitry as is known to generate RF transmissions from digital messages that it received from the computer 40, and transmit those messages to the networked device 12.

Additionally or alternatively, the communications circuit 44 may include an infrared receiver and infrared transmitter for communicating with the networked device 12.

Determining Remote Control Device Location Based on Received Signal Strength

Information regarding the location of the remote device 14 may be determined based on a received signal strength of return signals received by one or more networked devices 12 from the remote control device 14. The strength of a return signal received from a remote control device 14 by a networked device 12 decreases as the distance between the remote control device 14 and the networked device 12 increases.

Figure 4:
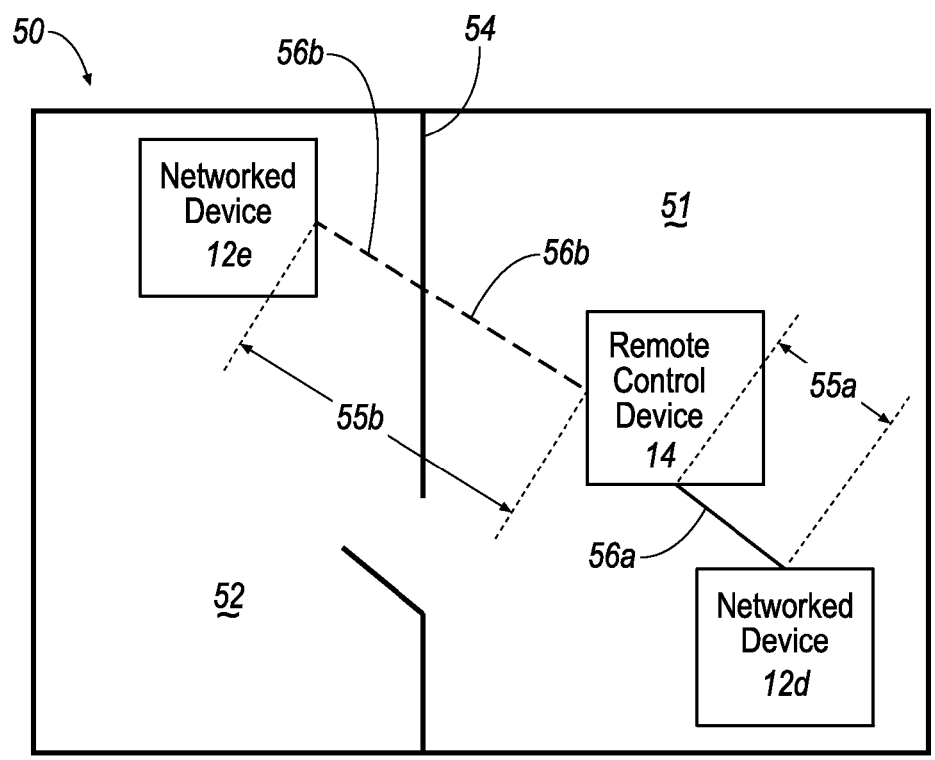
FIG. 4 is a diagram illustrating networked devices receiving respective return signals.

For example, as shown in FIG. 4, a residence 50 may include a first room 51 and a second room 52. The first and second rooms 51, 52 may be divided by a wall 54. The first room 51 may include a fourth networked device 12d and the remote control device 14. The second room 52 may include a fifth networked device 12e. The remote control device 14 may be a distance 55a from the fourth networked device 12d and may be a distance 55b from the fifth networked device 12e. The distance 55a may be less than the distance 55b.

In response to a command received from one or both of the first and second networked devices 12d, 12e, the remote control device 14 may send first and second return signals 56a, 56b. Due to the distance 55a being less than the distance 55b, the first return signal 56a, as received by the fourth networked device 12d, may be stronger than the second return signal 56b, received by the fifth networked device 12e. Based on the determination that the return signal 56a is stronger than the return signal 56b, a computer, for example, the computer 30 in one of the fourth or fifth networked devices 12d, 12e, may determine that the remote control device 14 is located nearer to the fourth networked device 12d and may further determine that the remote control device is in the first room 51.

Walls, ceilings, floors, obstacles, availability of reflective surfaces, etc. along or proximate to a transmission path may also affect the strength of a signal received from a remote control device 14 by a networked device 12. A system 10 may be, provided, for example, with a map indicating the location of networked devices 12 within the customer premises 16, and the presence and types of walls, ceilings, floors etc. The effect of these elements on the returned signal strength may be taken into account when determining which networked device 12 is nearest to the remote control device 14.

In some cases, a more detailed determination of the location of the remote control device 14 may be made. For example, in the example as shown in FIG. 4, based on the strengths of first and second return signals 56a, 56b, a computer 30 receiving the strength information may determine that the remote control device 14 is located between the first and second networked devices 12d, 12e, using triangulation methods as are known. In a case where additional return signals 56 are received by additional networked devices 12, more refined determinations may be made, taking into account the strength of all of the return signals 56.

Exemplary Process Flow

Figure 5:
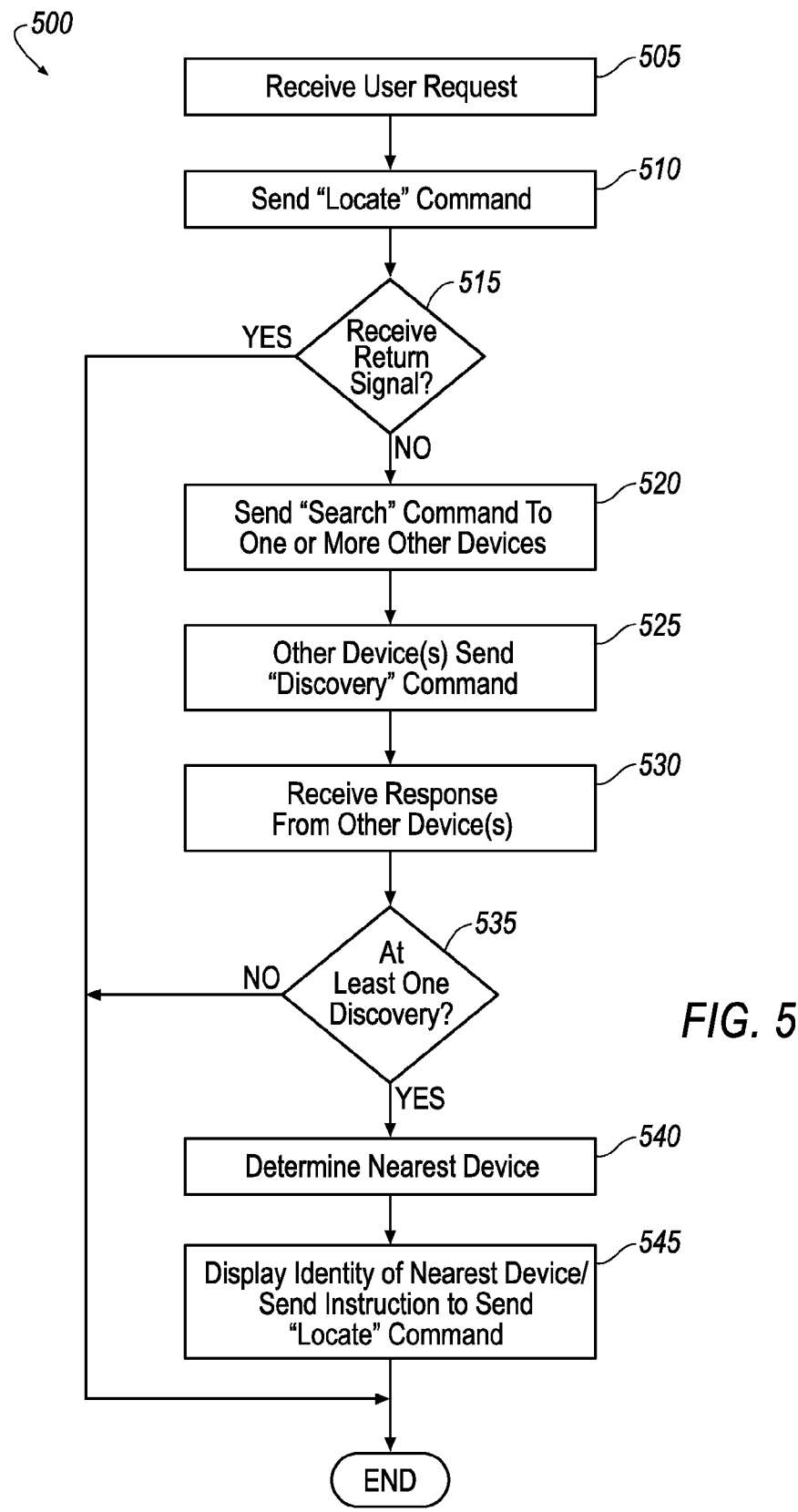
FIG. 5 is a diagram of an exemplary process for locating a remote control device.

FIG. 5 is a diagram of an exemplary process 500 for locating a remote control device 14. In the process 500, a first networked device 12a initiates a local search, i.e., within range of the first networked device 12a. If the first networked device 12a fails to find the remote control device 14 within range, the process 500 expands the search to one or more other networked devices 12. The process 500 begins in a block 505.

In the block 505, and referring to FIG. 1, a first networked device 12a receives an input from a user, requesting that the networked device 12a initiate a search for the remote control device 14. For example, the user may activate a "find remote" button or the like on the user interface 32 of the networked device 12a. The computer 30 of the networked device 12a may receive the input, and, based on the received input, initiate the search. The process 500 continues in a block 510.

In the block 510, the first networked device 12a may transmit a locate command to the remote control device 14. The remote control device 14 may be programmed or instructed, upon receiving the locate command, to generate an audible signal such as buzzing sound or a sequence of beeps, and to acknowledge receipt of the locate command by transmitting a return message to the first networked device 12a. The process 500 continues in a block 515.

In the block 515, the first networked device 12a determines if it received a return signal from the remote control device 14. For example, the first networked device 12a may listen for a return signal for a predetermined time period. The predetermined time period may be, for example, three seconds. If, within the predetermined time period, the networked device 12a receives a return message from the remote control device 14, the first networked device 12a may determine that the remote control device 14 has been found. The networked device 12a may indicate, e.g., on the user interface 32 associated with the networked device 12a that the remote control device 14 is located in the first room 18, and the process 500 ends.

If, on the other hand, the first networked device 12a does not receive a return message from the remote control device 14, the first networked device 12a generally determines to expand the search to include one or more other networked devices 12. Accordingly, the process 500 continues in a block 520.

In the block 520, the first networked device 12a may send a search command to one or more other networked devices 12, for example, a second networked device 12b and a third networked device 12c. The search command may request each of the second and third networked devices 12b, 12c to perform a search for the remote control device 14. The process 500 continues in a block 525.

In the block 525, the second and third networked devices 12b, 12c, search for the remote control device 14. For example, each of the second and third networked devices 12b, 12c may send a discovery command to the remote control device 14. The discovery command may request that the remote control device 14 send a return signal acknowledging receipt of the discovery command. The process 500 may then continue in a block 530.

In the block 530, the second and third networked devices 12b, 12c may wait a second predetermined time for a response. The second predetermined time period may be, e.g., three seconds. If either one or both of the second and third networked devices 12b, 12c receive a return signal from the remote control device 14, the networked device(s) receiving the return signal may measure a strength of the return signal, as described above. After the second predetermined time period, each of the second and third networked devices 12b, 12c, may send a respective return message to the first networked device 12a. Each of the return messages may indicate whether the respective networked device 12b, 12c received a return signal from the remote 14, and may further indicate, where applicable, the strength of the returned signal. The process 500 continues in a block 535.

In the block 535, the first networked device 12a, based on the return messages from the second and third networked devices 12b, 12c, determines whether one or both of the second and third networked devices 12b, 12c, received a return signal from the remote control device 14. If the first networked device 12a determines that neither of the second and third networked devices 12b, 12c received a return signal from the remote, the process 500 ends.

On the other hand, if one or both of the second and third networked devices 12b, 12c received a return signal, the process 500 continues in a block 540.

In the block 540, the first networked device 12a determines, based on the one or more received return signals, which of the second and third networked devices 12b, 12c, is nearest to the remote control device 14. If, for example, only one of the second and third networked devices 12b, 12c received a return signal from the remote control device 14, the first networked device 12a may determine that the one of the networked devices 12b, 12c receiving the return signal is nearest to the remote control device 14.

If, on the other hand, both of the second and third networked devices 12b, 12c received a return signal, the first networked device 12a may compare a received signal strength indication (RSSI) associated with each of the return signals. The first networked device 12a may determine that the one of the second and third networked devices 12b, 12c that received the strongest return signal, is nearest to the remote control device 14.

As described above, other factors may be considered in determining a location of the remote control device 14 based on the RSSI of one or more return signals. For example, if two or more networked devices 12 receive return signals, based on the RSSI of the respective signals, the first networked device 12a may determine that the remote control device 14 is located in an area between the two or more networked devices 12. The first networked device 12a may further consider map data indicating a location of each networked device 12 in the residence 16. Attenuation of return signals by walls included in the residence 16 may be considered. Further, triangulation methods, as are known, may be used to determine a more precise location of the remote control device 14. The process 500 continues in a block 545.

In the block 545, the first networked device 12a may indicate via the user interface 32 of the first networked device 12a an identity of the second or third networked device 12b, 12c, determined to be nearest to the remote control device 14. In this manner, the user may determine an approximate location of the remote control device 14. For example, the third networked device 12c may be identified as being closest to the remote control device 14. The user may determine, based on the displayed identity, that the remote control device 14 is the third room 22.

In the case that the first networked device 12a determines a more precise location, for example, in an area between the second and third networked devices 12b, 12c, the first networked device 12a, may display, for example, a layout of the residence 16, and indicate an area within the residence 16 where the remote control device 14 may be located.

In addition to indicating a location of the remote control device 14 on a display, the first networked device 12a may instruct, e.g., the third networked devices 12c to send a locate command to the remote control device 14. The networked device 12c may send the locate command to the remote control device 14. The remote control device 14 may be programmed or instructed, upon receiving the locate command, to generate an audible signal. In this manner, the user may, upon entering the third room 22, receive an audible indication of the location of the remote control device 14. The process 500 ends.

Figure 6:
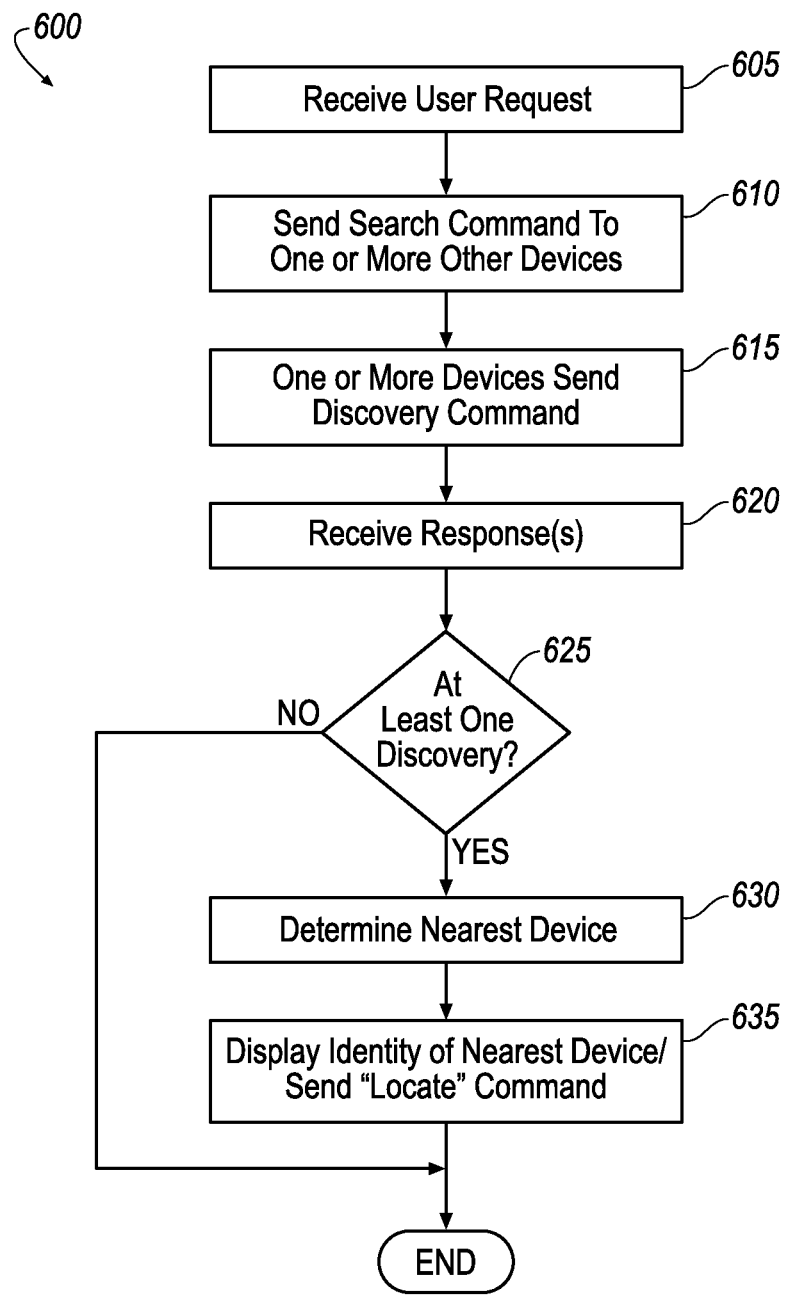
FIG. 6 is a diagram of an exemplary process for locating a remote control device.

FIG. 6 is a diagram of an exemplary process 600 for locating a remote control device 14. In the process 600, a first networked device 12a initiates, upon receiving an input from a user, a network search. The first networked device 12a may transmit commands to receive responses directly from the remote control device 14. The first networked device 12a may further transmit to and receive responses from one or more other networked devices 12. Based on the responses, the first computer 12a identifies a networked device 12 nearest to the remote control device 14, or other information related to the location of the remote control device 14. The process 600 begins in a block 605.

In the block 605, and referring to FIG. 1, a first networked device 12a receives an input from a user, requesting that the networked device 12a initiate a search for the remote control device 14 as described with reference to block 505. The process 600 continues in a block 610.

In the block 610, the first networked device 12a sends a search command to one or more other networked devices 12, for example, the second and third networked device 12b, 12c. The search command may request each of the second and third networked devices 12b, 12c perform a search for the remote control device 14. The process 600 continues in a block 615.

In the block 615, each of the first, second and third networked devices 12a, 12b, 12c search for the remote control device 14. For example, each of the first, second and third networked devices 12a, 12b, 12c may send a discovery command to the remote control device 14. The discovery command may request that the remote control device 14 send a return signal acknowledging receipt of the discovery command. The process 600 may then continue in a block 620.

In the block 620, the first, second and third networked devices 12a, 12b, 12c may wait a predetermined time period for a response. The predetermined time period may be, e.g., three seconds. Each of the first, second and third networked devices 12a, 12b, 12c which receives a return signal from the remote control device 14, may measure a strength of the return signal, as described above. After the predetermined time period, each of the second and third networked devices 12b, 12c, may send a respective return message to the first networked device 12a. Each of the return messages may indicate whether the respective networked device 12b, 12c received a return signal from the remote 14, and may further indicate, when applicable, the strength of the returned signal. The first networked device 12a may organize and store in a memory, the responses from the second and third networked devices 12b, 12c, together with the response it received directly from the remote control device 14. The process 600 continues in a block 625.

In the block 625, the first networked device 12a, based on the return messages from the second and third networked devices 12b, 12c, and when applicable, the return signal received directly from the remote control device 14, may initially determine, which, if any of the first, second or third networked devices received a return signal. If, for example, the first networked device 12a determines that none of the first, second and third networked devices 12a, 12b, 12c received a return signal, the first networked device 12a may indicate on the user interface 32 that the remote control device 14 was not located. The process 600 may end.

If, on the other hand, the first networked device determines that at least one of the first, second and third networked devices 12a, 12b, 12c, received a return signal from the remote control device 14, the process 600 continues in a block 630.

In the block 630, the first networked device 12a determines, based on the one or more received return signals, which of the first, second and third networked devices 12a, 12b, 12c, is nearest to the remote control device 14. If, for example, only one of the first, second and third networked devices 12a, 12b, 12c received a return signal from the remote control device 14, the first networked device 12a may determine that the one of the networked devices 12a, 12b, 12c receiving the return signal is nearest to the remote control device 14.

If, on the other hand, two or more of the first, second and third networked devices 12b, 12c received a return signal, the first networked device 12a may evaluate a received signal strength indication (RSSI) associated with each of the return signals. The first networked device 12a may determine that the one of the first, second and third networked devices 12a, 12b, 12c that received the strongest return signal, is nearest to the remote control device 14.

The first networked device 12a may further consider additional factors in determining a location of the remote control device 14. For example, if two or more networked devices 12 receive return signals, based on the RSSI of the respective signals, the first networked device 12a may determine that the remote control device 14 is located in an area between the two or more networked devices 12. The first networked device 12a may further consider map data indicating a location of each networked device 12 in the residence 16. Attenuation of return signals by walls included in the residence 16 may be considered. Further, triangulation methods, as are known, may be used to determine a more precise location of the remote control device 14. The process 600 continues in a block 635.

In the block 635, the first networked device 12a may indicate via the user interface 32 of the first networked device 12a an identity of the first, second or third networked device 12a, 12b, 12c, determined to be nearest to the remote control device 14. In this manner, the user may determine an approximate location of the remote control device 14. For example, the third networked device 12c may be identified as being closest to the remote control device 14. The user may determine, based on the displayed identity, that the remote control device 14 is the third room 22.

In the case that the first networked device 12a determines a more precise location for the remote control device 14, may display, for example, a layout of the residence 16, and indicate an area within the residence 16 where the remote control device 14 may be located.

In addition to providing information related to the location of the remote control device 14 on a display, the first networked device 12a may instruct, e.g., the third networked devices 12c to send a locate command to the remote control device 14. The networked device 12c may send the locate command to the remote control device 14. The remote control device 14 may be programmed or instructed, upon receiving the locate command, to generate an audible signal. In this manner, the user may, upon entering the third room 22, receive an audible indication of the location of the remote control device 14. The process 600 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
a networked device including a processor and a memory, the memory storing instructions executable by the processor such that the processor is programmed to:
transmit a first request to at least one second networked device to transmit a second request to a remote control device of the networked device to send a return signal; and
provide an indication via a user interface of the networked device concerning a location of the remote control device, based on at least one response to the first request.

2. The system of claim 1, wherein the processor is further programmed to:
transmit, to the remote control device, a third request to locate the remote control device; and
wait a predetermined amount of time for a response to the third request, wherein the indicated location takes into account the response to the third request received within the predetermined amount of time.

3. The system of claim 1, wherein the processor is further programmed to determine a signal strength of the return signal as received by the respective second networked device based on the at least one response to the first request.

4. The system of claim 3, wherein the indicated location is determined based in part on the determined signal strength of the return signal as received by each of the respective second networked devices.

5. The system of claim 1, wherein the processor is further programmed to:
determine, based on the at least one response, a second networked device that is in a range to communicate with the remote control device; and
transmit, via the second networked device determined to be in the range, a request for the remote control device to generate an audible signal.

6. The system of claim 1, wherein each of the at least one second networked devices is operable to respond to commands from the remote control device.

7. The system of claim 1, wherein the processor is further programmed to receive, from the user interface of the networked device, an input, wherein transmitting the first request to the at least one second networked device is based in part on receiving the input.

8. The system of claim 1, wherein the at least one second networked device includes a processor and a memory, the memory of the second networked device storing instructions executable by the processor of the second networked device such that the processor of the second networked device is programmed to:
receive the first request from the networked device to transmit the second request to the remote control device;
transmit, based on the request, to the remote control device, the second request to the remote control device to send the return signal;
wait a predetermined amount of time for the return signal;
determine that the return signal is received within the predetermined amount of time;
measure a signal strength of the return signal; and
respond to the first request from the networked device, including an indication of the measured signal strength.

9. A system comprising:
a networked device, including a processor and a memory, the memory storing instructions executable by the processor such that the processor is programmed to:
transmit, to a remote control device for the networked device, a first request to locate the remote control device;
wait a predetermined amount of time for a response to the first request;
transmit, to at least one second networked device, upon failing to receive the response to the first request within the predetermined amount of time, a second request to transmit a third request to the remote control device to send a return signal; and
provide an indication via a user interface of the networked device concerning a location of the remote control device based on at least one response to the second request.

10. The system of claim 9, wherein the processor is further programmed to determine a signal strength of the return signal as received by the respective second networked device based on the at least one response to the second request.

11. The system of claim 10, wherein the processor is further programmed to determine, based on the signal strength of the return signal as received by the respective second networked device, the location of the remote control device.

12. The system of claim 9, wherein the processor is further programmed to:
   determine, based on the at least one response, a second networked device that is in a range to communicate with the remote control device, and
   transmit, via the second networked device determined to be in the range to communicate with the remote device, a request for the remote control device to generate an audible signal.

13. The system of claim 9, wherein each of the at least one second network devices is operable to respond to commands from the remote control device.

14. The system of claim 9, wherein the processor is further programmed to:
   receive, from the user interface of the networked device, an input, wherein transmitting the first request to the at least one second networked device is based in part on receiving the input.

15. The system of claim 9, wherein the at least one second networked device includes a processor and a memory, the memory storing instructions executable by the processor such that the processor is programmed to:
   receive the second request from the networked device to transmit the third request to the remote control device to send the return signal;
   transmit, based on the second request, to the remote control device, the third request;
   wait a predetermined amount of time for the return signal;
   determine that the return signal was received within the predetermined amount of time;
   measure a signal strength of the return signal; and
   respond to the second request from the networked device, including an indication of the measured signal strength.

16. A method, implemented by a networked device including a processor and a memory, the memory storing instructions executable by the processor, comprising:
   transmitting a first request to at least one second networked device to send a second request to a remote control device of the networked device to send a return signal; and
   providing an indication via a user interface of the networked device concerning a location of the remote control device, based on at least one response to the first request.

17. The method of claim 16, further comprising
   transmitting, to the remote control device, a second third request to locate the remote control device; and
   waiting a predetermined amount of time for a response to the third request, wherein the indicated location takes into account the response to the third request received within the predetermined amount of time.

18. The method of claim 16, further comprising:
   determining a signal strength of the return signal as received by the respective second networked device based on the at least one response to the first request.

19. The method of claim 18, wherein the indicated location is determined based in part on the determined signal strength of the return signal as received by each of the respective second networked devices.

20. The method of claim 16, further comprising:
   determining, based on the at least one response, a second networked device that is in a range to communicate with the remote control device; and
   transmitting, via the second networked devices determined to be in the range, a request for the remote device to generate an audible signal.

21. The method of claim 16, further comprising:
   receiving, from the user interface of the networked device, an input, wherein transmitting the first request to the at least one second networked device is based in part on receiving the input.

22. The method of claim 16, further comprising:
   receiving, by the at least one second networked device, the first request from the networked device to transmit the second request to the remote control device from the networked device;
   transmitting, from the second networked device, to the remote control device, the second request to the remote control device to send the return signal; and
   waiting, by the second networked device, a predetermined amount of time for the return signal;
   determining, by the second networked device that the return signal was received within the predetermined amount of time;
   measuring, by the second networked device, a signal strength of the return signal; and
   responding, by the second networked device, to the first request from the networked device, including an indication of the measured signal strength.

\* \* \* \* \*